United States Patent
Leon Calvo et al.

(10) Patent No.: US 12,309,057 B2
(45) Date of Patent: May 20, 2025

(54) PACKET DUPLICATION OVER MULTIPLE SIDELINKS

(71) Applicant: Telefonaktiebolaget LM Ericsson (publ), Stockholm (SE)

(72) Inventors: Jose Angel Leon Calvo, Aachen (DE); Antonino Orsino, Kirkkonummi (FI); Congchi Zhang, Shanghai (CN); Zhang Zhang, Beijing (CN); Liang Hu, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 17/801,873

(22) PCT Filed: Jan. 20, 2021

(86) PCT No.: PCT/EP2021/051149
§ 371 (c)(1),
(2) Date: Aug. 24, 2022

(87) PCT Pub. No.: WO2021/175507
PCT Pub. Date: Sep. 10, 2021

(65) Prior Publication Data
US 2023/0082166 A1    Mar. 16, 2023

(51) Int. Cl.
*H04L 45/24* (2022.01)
*H04W 40/02* (2009.01)
*H04W 80/08* (2009.01)

(52) U.S. Cl.
CPC ............. *H04L 45/24* (2013.01); *H04W 40/02* (2013.01); *H04W 80/08* (2013.01)

(58) Field of Classification Search
CPC ...... H04L 45/24; H04W 40/02; H04W 80/08; H04W 40/00
See application file for complete search history.

(56) References Cited

U.S. PATENT DOCUMENTS 6,473,399 B1 * 10/2002 Johansson ............. H04L 1/1848
370/468
2019/0158993 A1    5/2019 Kwon
(Continued)

FOREIGN PATENT DOCUMENTS

EP    3606278 A1    2/2020

OTHER PUBLICATIONS

3GPP, "3GPP TS 23.287 V16.1.0", 3rd Generation Partnership Project; Technical Specification Group Services and System Aspects; Architecture enhancements for 5G System (5GS) to support Vehicle-to-Everything (V2X) services (Release 16), Dec. 2019, 1-51.
(Continued)

*Primary Examiner* — Ayaz R Sheikh
*Assistant Examiner* — Tarell A Hampton
(74) *Attorney, Agent, or Firm* — Sonoda & Kobayashi Intellectual Property Law; Sarvajit S. Patil (57) ABSTRACT

Embodiments described herein relate to methods and apparatus for communicating between devices using sidelinks. There is provided a method performed by a transmitting device for transmitting a packet to a destination device. The method comprises duplicating the packet and adding header information to form duplicated modified packets, each having a respective duplication identifier. Multiple wireless pathways to the destination device are determined, each wireless pathway comprising a sidelink. The duplicated modified packets are transmitted onto respective wireless pathways.

10 Claims, 7 Drawing Sheets

(56) References Cited

U.S. PATENT DOCUMENTS

| | | | |
|---|---|---|---|
| 2019/0253927 A1* | 8/2019 | Mok | H04W 28/0268 |
| 2019/0254062 A1 | 8/2019 | Wu et al. | |
| 2019/0254117 A1* | 8/2019 | Chen | H04L 47/34 |
| 2019/0357196 A1* | 11/2019 | Majmundar | H04L 49/3072 |
| 2020/0059821 A1 | 2/2020 | Wirth et al. | |
| 2020/0092685 A1* | 3/2020 | Fehrenbach | H04W 84/005 |
| 2020/0092944 A1* | 3/2020 | Baek | H04W 80/02 |
| 2020/0267790 A1* | 8/2020 | Kim | H04W 48/16 |
| 2020/0275303 A1* | 8/2020 | Mok | H04L 1/08 |
| 2021/0153063 A1* | 5/2021 | Zhang | H04W 80/02 |
| 2021/0274545 A1* | 9/2021 | Adjakple | H04W 72/21 |
| 2021/0306913 A1* | 9/2021 | Li | H04W 76/11 |
| 2022/0132603 A1* | 4/2022 | Adjakple | H04W 4/40 |
| 2022/0263750 A1* | 8/2022 | Kousaridas | H04L 47/34 |
| 2022/0286234 A1* | 9/2022 | Zhao | H04W 28/24 |
| 2023/0026499 A1* | 1/2023 | Zhao | H04W 48/20 |

OTHER PUBLICATIONS

3GPP, "3GPP TS 38.323 V15.6.0", 3rd Generation Partnership Project; Technical Specification Group Radio Access Network; NR; Packet Data Convergence Protocol (PDCP) specification (Release 15), Jun. 2019, 1-26.

3GPP, "3GPP TS 38.323 V16.0.0", 3rd Generation Partnership Project; Technical Specification Group Radio Access Network; NR; Packet Data Convergence Protocol (PDCP) specification (Release 16), Mar. 2020, 1-37.

* cited by examiner

PACKET DUPLICATION OVER MULTIPLE SIDELINKS

TECHNICAL FIELD

Embodiments disclosed herein relate to methods and apparatus for communicating between a transmitting device and a destination device using multiple sidelinks.

BACKGROUND

The third-generation partnership (3GPP) is currently working on standardization of Long Term Evolution (LTE) and Fifth Generation New Radio (5G NR) technologies. These include improvements to LTE and 5G NR device-to-device technology, also known as ProSe (Proximity Services). ProSe allows 3GPP specified devices to communicate directly with each other without having to connect via a base station such as Enhanced NodeB (eNB) or 5G Node B (gNB). The device-to-device connection uses standardized 3GPP Layer 1 and Layer 2 technology to connect with an eNB or gNB, which enables reuse of this technology whilst providing robust device-to-device connections using well proven LTE and 5G NR connection technology. These standardized 3GPP device-to-device connections are called as sidelinks, including for example the PC5 interface.

Sidelinks are used in many applications including maintaining cellular "coverage" in tunnels where direct communications with an eNB or gNB may not be possible and communication is effected via sidelinks with other terminal devices that can connect directly with an eNB or gNB. Another application is National Security and Public Safety (NSPS) which may provide for an emergency channel through cellular networks in situations where some infrastructure, including eNB and/or gNB, has been destroyed following a natural disaster or is otherwise not available in some areas. Sidelinks may also be used inside buildings where direct communication with a base station can be intermittent due to propagation issues through walls. Sidelinks may also be targeted at the specific characteristics of vehicle communications, where so called V2X allows connections between a terminal in a vehicle with another terminal which may be associated with another vehicle, a pedestrian or in any other proximate location. Example V2X applications include vehicles platooning, extended sensors, advanced driving, remote driving.

Applications using sidelinks for connecting nearby devices face certain challenges including that the combination of their short range and devices moving relative to each other can result in sudden and unexpected failure of the connections.

SUMMARY

According to certain embodiments described herein there is provided a method performed by a transmitting device for transmitting a packet to a destination device. The method comprises duplicating the packet and adding header information to form duplicated modified packets, each having a respective duplication identifier. Multiple wireless pathways to the destination device are determined, each wireless pathway comprising a sidelink. The duplicated modified packets are transmitted onto respective wireless pathways.

By providing data over multiple diverse pathways, the use of sidelinks for communications between devices can be made more robust.

According to certain embodiments described herein there is provided a method performed by a relay device for receiving a packet and forwarding the packet to a destination device. The method comprises receiving the packet on a first sidelink and transmitting the received packet onto a second sidelink towards the destination device if the packet has a duplication identifier and an indication to forward the packet to the destination device.

According to certain embodiments described herein there is provided a method performed by a destination device to receive a packet. The method comprises receiving duplicated modified packets each having header information including a respective duplication identifier. The duplicated modified packets are received on respective multiple wireless pathways, each wireless pathway comprising a sidelink. The received duplicated modified packets are de-duplicated including removing the duplication identifier in order to receive the packet.

According to certain embodiments described herein there is provided a computer program comprising instructions which, when executed on a processor, cause the processor to carry out the method described herein. The computer program may be stored on a non transitory computer readable media.

According to certain embodiments described herein there is provided a transmitting device for transmitting a packet to a destination device The transmitting device comprises a processor and memory containing instructions executable by the processor to duplicate the packet and add header information to form duplicated modified packets each having a respective duplication identifier. Multiple wireless pathways to the destination device are determined, each wireless pathway comprising a sidelink. The duplicated modified packets are transmitted onto respective wireless pathways.

According to certain embodiments described herein there is provided a relay device for receiving a packet and forwarding the packet to a destination device. The relay device comprises a processor and memory containing instructions executable by the processor to receive the packet on a first sidelink and to transmit the received packet onto a second sidelink towards the destination device if the packet has a duplication identifier and an indication to forward the packet to the destination device.

According to certain embodiments described herein there is provided a destination device for receiving a packet. The destination device comprises a processor and memory containing instructions executable by the processor to receive duplicated modified packets, each having header information including a respective duplication identifier. The duplicated modified packets are received on respective multiple wireless pathways, each wireless pathway comprising a sidelink. The received duplicated modified packets are de-duplicated including removing the duplication identifier in order to receive the packet.

According to certain embodiments described herein there is provide a method of transmitting and receiving a packet in a communications system. The system comprises a transmitting device, a plurality of relay devices and a destination device. The method comprises at the transmitting device duplicating the packet and adding header information to form duplicated modified packets, each having a respective duplication identifier. Multiple wireless pathways are determined to the destination device, each wireless pathway having a sidelink. The duplicated modified packets are transmitted respective wireless pathways to relays devices. At the relay devices, the packet is received on a first sidelink and is transmitted onto a second sidelink towards the destination device if the packet has a duplication identifier and an indication to forward the packet to the destination device. At the destination device, the duplicated modified packets are received, each having header information including a respective duplication identifier. The duplicated modified packets are received on respective multiple wireless pathways, each wireless pathway having a sidelink. The received duplicated modified packets are de-duplicated, including removing the duplication identifier in order to receive the packet.

BRIEF DESCRIPTION OF DRAWINGS

For a better understanding of the embodiments of the present disclosure, and to show how it may be put into effect, reference will now be made, by way of example only, to the accompanying drawings, in which.

DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions. Memory may be employed to storing temporary variables, holding and transfer of data between processes, non-volatile configuration settings, standard messaging formats and the like. Any suitable form of volatile memory and non-volatile storage may be employed including Random Access Memory (RAM) implemented as Metal Oxide Semiconductors (MOS) or Integrated Circuits (IC), and storage implemented as hard disk drives and flash memory.

Embodiments described herein relate to methods and apparatus to allow transmitting duplicate packets over an end-to-end connection between entities over diverse sidelinks or multiple wireless pathways each including one or more sidelinks. The diverse pathways enhance reliability and the use of sidelinks reduces latency and allows connections without a link to the base station. Embodiments also support pathways with multihop sidelinks which may be advantageous in vehicle related applications where pathways amongst a group of vehicles may change quickly.

The term sidelink referred to herein refers to a 3GPP defined communication between two (or more) which reuses LTE and/or 5G NR Layer 1 and Layer 2 technologies. Many of these technologies are also used in communications between the devices and a eNB or gNB base station. An example sidelink is the PC5 interface. Sidelinks were first specified in Releases 12 and 13 of the 3GPP LTE specifications. LTE V2X enhancements targeting specific characteristics of vehicular communications were specified in Releases 14 and 15, and work was begun on 5G NR V2X in Release 16. Initial work is underway for Release 17 which is expected to introduce further enhancements for V2X, NSPS and other applications of sidelinks.

Figure 1:
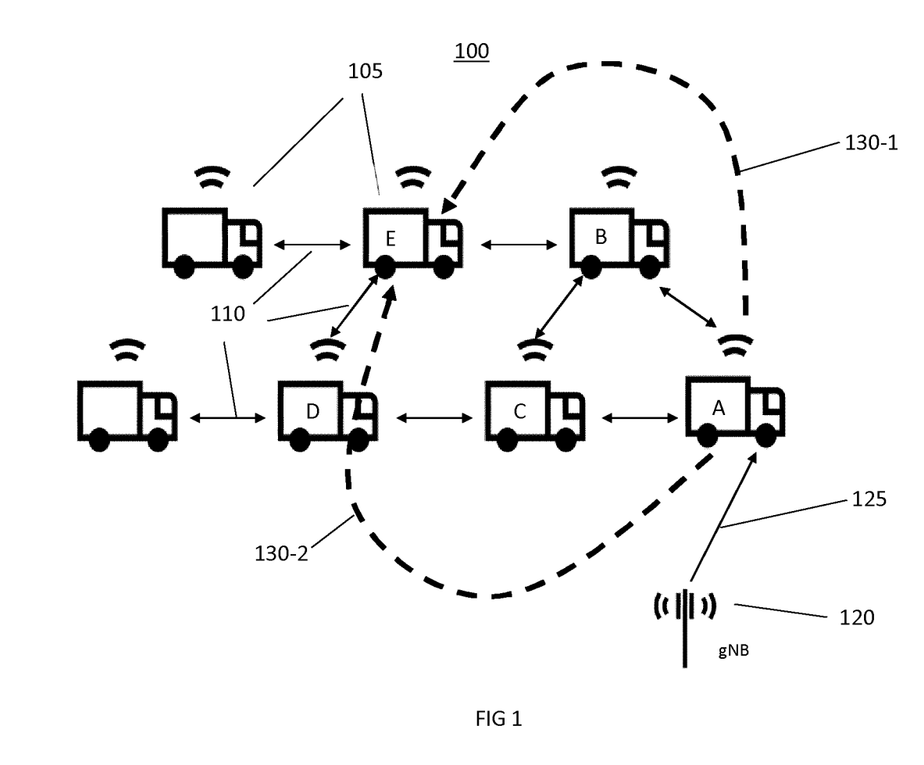
FIG. 1 is a schematic diagram illustrating a communications system according to some embodiments.

FIG. 1 is a schematic diagram illustrating a communications system 100 comprising a number of terminal devices 105 capable of forming sidelink connections 110 with each other. The terminal devices may be associated with vehicles with the sidelinks enabling functionality such as platooning where vehicles travel together in a group and communicate with each other to coordinate their movements and control. One or more of the terminal devices may also be connected to a base station such as a 5G NR gNB 120 via a 5G NR connection 125. Messages or packets may be forwarded between terminal devices over multiple wireless pathways 130-1 and 130-2, each using one or more sidelinks 110. For example the terminal device 105A in a lead vehicle 105A in a platoon may send packets to a terminal device 105E in a trailing vehicle. Packets may be used to send information such as speed and position of the lead vehicle or commands such as begin braking.

Multiple pathways may be available to send the information or commands and the pathways may change over time due to the changing propagation environment, changing location of physical obstacles and vehicles joining or leaving the platoon. Therefore, each time packets are to be sent, it may be necessary to discover and select the available/best pathways to use between two endpoints. Various sidelink discovery procedures could be used, including for example that defined in 3GPP specification TS23.287 v16.1.0, section 6.3.3.

The packets to be transmitted from 105A to 105E may be duplicated once and sent over two pathways 130-1 and 130-2 as shown, or they may be duplicated additional times and sent over respective pathways. In this duplication of a packet means that at least the payload of the duplicated packets is identical. Each pathway 130-1, 130-2 may include one or more sidelinks 105 providing multihop sidelink pathways. One or more pathways may even include a link from one terminal device to the gNB and back to another terminal device. By duplicating the packets to be transmitted and transmitting these over multiple sidelink based pathways, the reliability of the end-to-end connection is advantageously improved.

Whilst the embodiment is described with respect to a vehicle platooning application, many other applications are possible including stationary devices such as smart traffic lights or other displays signaling to vehicles, National Security Public Safety (NSPS) applications which may allow coverage to be extended beyond the range of active gNB using sidelinks, for example following damage to infrastructure after a natural disaster. The use of duplicated packets over sidelinks may also be used in non-emergency situations to extend the range of gNB coverage for example in tunnels or buildings where signals from a gNB may not be able to propagate.

Figure 2:
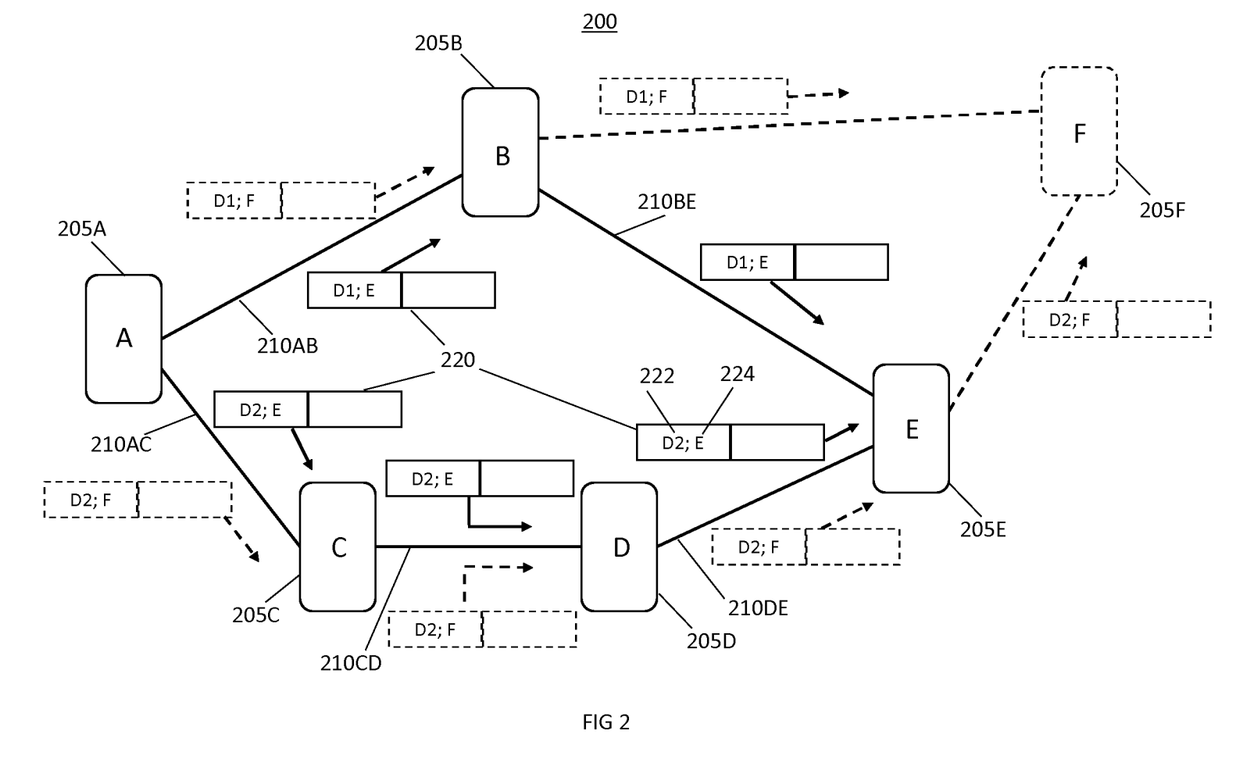
FIG. 2 is a schematic diagram illustrating duplicate packet transfer over multiple sidelinks.

FIG. 2 is schematic diagram illustrating packet duplication over diverse sidelink pathways. A communications system 200 comprises a number of terminal devices 205A-205F, some pairs of which have established sidelinks 210 between themselves. In an illustrated example, two wireless pathways have been established using some sidelinks to provide an end-to-end connection between terminal devices 205A and 205E. The first pathway includes a relay device 205B and multihop sidelinks 210AB and 210BE. The second pathway includes two relays devices 205C and 205D and three sidelinks 210AC, 205CD and 205DE. The pathways from 205A and 205E may be discovered and selected as noted previously. Packets 120 are illustrated being forwarded from terminal device 205A to 205E. Packet Data Convergence Protocol (PDCP) packets may be employed although other packet types may alternatively be used. The existing PDCP advantageously provides routing and packet duplication functionality which allows the embodiment to be more easily adopted into legacy devices, for example with a software update, with the new functionality provided transparently.

The packets 120 are duplicated at the transmitting device 205A and de-duplicated at the destination device 205E. Each packet is associated with a duplication identifier D1, D2 so that duplicated packets may be recognized and de-duplicated at the destination device. Duplicated packets are also forwarded over respective pathways, for example packets having D1 as a duplication identifier may be forwarded over sidelinks 201AB and 210BE, and packets having D2 may be forwarded over sidelinks 210AC, 210CD, 210DE. The duplication identifier may simply be a duplication number added to header information of the packet; for example "1" for the first packet, "2" for a first duplication of the packet, "3" for a second duplication of the packet, and so on. Alternatively or additionally the duplication identifier may be a pathway identifier added to the header information of the transmitted packets, or any other suitable identifier that can distinguish between duplicated packets. For example, the duplication identifier could be a pathway identifier determined during the discovery process to uniquely identify a combination of devices using in the pathway, or the combination of the device identifiers of the devices used in the pathway. In another alternative the duplication identifier may be a unicast Layer 2 IndividualID or a multicast Layer 2 GroupID.

In this embodiment the packets 120 also include a destination device identifier E; this could be a MAC address or any other suitable identifier capable of distinguishing the destination device 205E from other devices 205A-205D, 205F. The destination device identifier E may be added to the header information of the duplicated packets 120 as shown. Packets in dashed outline are shown where the destination device is 205F, these packets each having a destination device identifier F in their header information together with a duplication identifier D1 or D2. Together with the known packet sequencing numbering mechanism for PDCP packets, it is therefore possible to distinguish duplicated packets at the destination device 205E. Each packet will include sequencing information together with a respective duplication identifier so that the destination device can identify and associate packets having common duplicate identifiers and recover the sequence of packets by de-duplicating those that have been received more than once; that is both duplicated packets for the same sequence number have been received. If one of the duplicated packets for a particular sequence number is lost over the wireless pathway, the other duplicated packet for that sequence number may still be received and recovered by the destination device.

The use of PDCP packets advantageously allows the use of existing PDCP layers to provide routing and packet duplication functionality which allows the embodiment to be more easily adopted into legacy devices, for example with a software update, with the new functionality provided transparently. The new header information may be added into the PDCP packet, for example In known arrangements there is one PDCP entity per radio bearer configured for a device. Dual connectivity is enabled in 5G NR systems due to the PDCP layer. Packets can be duplicated and transmitted on multiple cells, increasing the likelihood of at least one copy being correctly received. This can be useful for services requiring very high reliability. At the receiving end, the PDCP layer duplicate removal functionality removes any duplicates. This results in path selection diversity. Dual connectivity is another area where the PDCP layer is used. In dual connectivity, a device is connected to two cells, or in general, two cell groups, the Master Cell Group (MCG) and the Secondary Cell Group (SCG). The two cell groups can be handled by different gNBs. A radio bearer is typically handled by one of the cell groups, but there is also the possibility for split bearers, in which case one radio bearer is handled by both cell groups. In this case the PDCP is in charge of distributing the data between the MCG and the SCG. The PDCP duplication and de-duplication functionality can be repurposed for this embodiment. However other duplication and de-duplication functionality may alternatively be used, implemented for example in different known or new layers.

The header information of each packet may also include one or more of the following additional information: for example the number of duplications of each packet; a source device identifier corresponding to the transmitting device 205A; a PDCP identifier corresponding to a PDCP association between respective PDCP layers in the transmitting 205A and destination 205E devices; path information including a device identifier for the next sidelink hop (e.g. 205C) and/or devices identifiers for all hops in the pathways (e.g. 205C, 205D).

The duplication identifier, and additional information if used, may be added into the PDCP packet header using one or more reserved bits, for example those identified as R in TS 38.323 R-16. This will provide duplicated PDUs with an adapted and enlarged header but identical payload.

The sidelinks 210 may each comprise a PC5 interface or channel.

Figure 3:
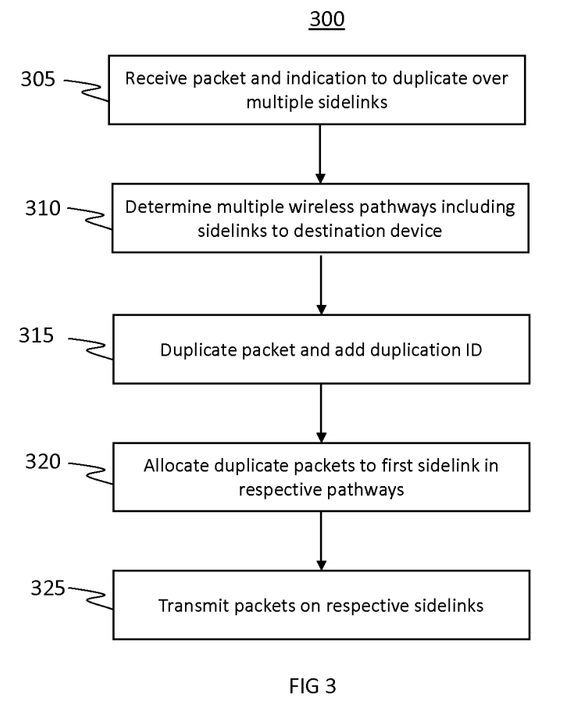
FIG. 3 is a flow diagram illustrating a method implemented in a transmitting device according to some embodiments.
Figure 4:
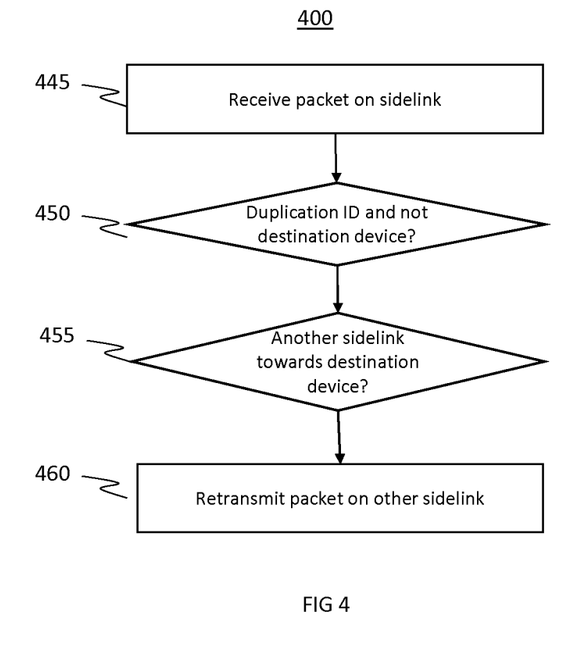
FIG. 4 is a flow diagram illustrating a method implemented in a relay device according to some embodiments.
Figure 5:
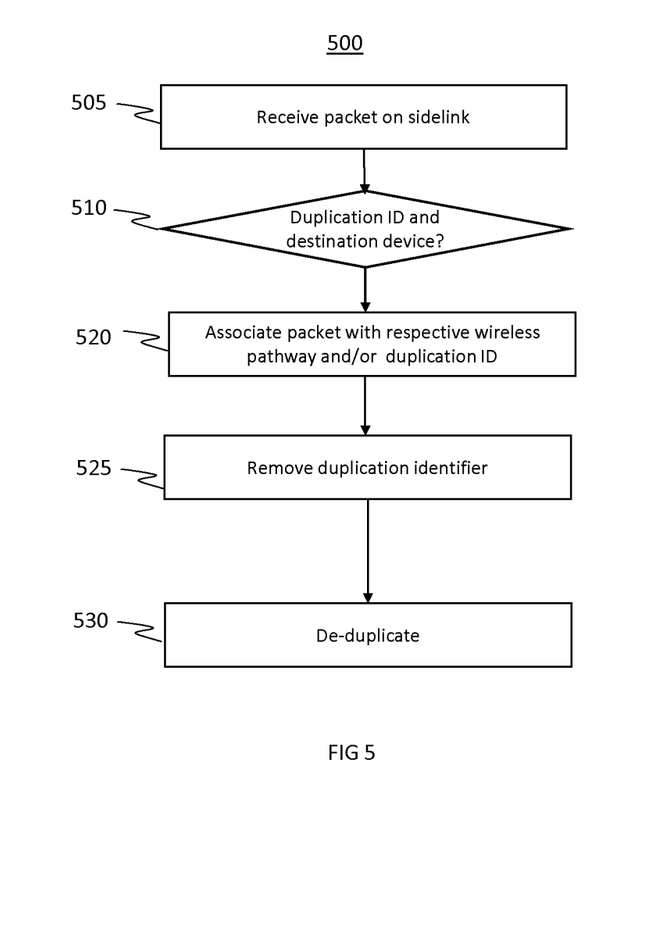
FIG. 5 is a flow diagram illustrating a method implemented in a destination device according to some embodiments.

FIGS. 3, 4 and 5 illustrate methods of operating a transmitting device, a relay device and a destination device respectively. Whilst these are described with respect to PDCP packets, other packet types may alternatively be used. A method of transmitting a packet is illustrated in FIG. 3. This method 300 may be implemented by the device 205A of FIG. 2. In step 305, the method receives a packet and an indication to duplicate over multiple sidelinks. The packet of packet data unit (PDU) may be received from a Service Data Adaption Protocol (SDAP) layer for example, together with an indication from a higher layer that the duplication process of the embodiment should be used to form an end-to-end connection with a destination device. The indication may be a flag in the header information of the SDAP PDU. Destination device information or an identifier is provided by the SDAP layer, for example in the header information.

The transmitting device may have two or more sidelinks to nearby devices, which in turn may have sidelinks to other devices. Two diverse sidelink pathways may be available to connect the transmitting device to the destination device. At step 310, the method then determines two or more wireless pathways to the destination device, each including one or more sidelinks. This may be achieved by the discovery and selection mechanism noted above, or any other suitable process. The discovery and selection method provides device information or identifiers for relay devices for each pathway.

At step 315, the packet is duplicated and a duplication identifier added to each duplicated packet. The packet may be duplicated multiple times and a respective duplication identifier added to each. This may be implemented in an existing PDCP layer as described in more detail below, which forms a PDCP PDU including sequence numbers, duplicates this. Normally the duplicated PDCP PDU would be forwarded to lower layers such as Radio Link Control (RLC) layers for transmitting to the next device. However, in an embodiment the duplicated PDCP PDU are forwarded to a new layer which adds respective duplication identifiers to their header information, for example in currently unused bits. These duplicated modified packets are then sent to lower layers, for example respective RLC layers, for forwarding to the next device. The duplication identifier may be a duplication number for the respective packet, for example representing the first or second duplicate, or it may be a path identifier used to forward the packet along the appropriate sidelink pathway to the destination The method may also add a destination device identifier to the header information, for example E from FIG. 2, as well as other additional information including: for example the number of duplications of each packet; a source device identifier; a PDCP identifier; path information including a device identifier for the next sidelink hop and/or devices identifiers for all hops in the pathways.

At step 320, the method allocates each duplicated modified packets to the first sidelink of the wireless pathway associated with that packets duplicate identifier. For example a duplicated modified packet having a duplicate identifier of "1" is sent to an RLC layer for the sidelink 210AB between the transmitting device 205A and the relay device 205B and the duplicated modified packet having a duplicate identifier of "2" is sent to an RLC layer for the sidelink 210AC between the transmitting device 205A and the relay device 205C.

At step 325, the duplicated modified packets are transmitted on respective sidelinks or pathways. Each RLC layer maintains a sidelink with a respective nearby device as is known, and operates in its normal manner to receive the duplicated modified packet, process and send this on the sidelink to the next device.

A method of receiving and forwarding a duplicated modified packet is illustrated in FIG. 4. This method 400 may be implemented on by the relay devices 205B-205D of FIG. 2. At step 445, the method receives a packet on a sidelink as is known, for example using a PC5 interface with a transmitting device 205A. At step 450, the method determines whether the packet includes a duplication identifier and whether the device is the destination device. This may require an adaptation layer above the RLC layer to inspect the PDCP packet header information for the duplication identifier and destination device identifier. If there is a duplication identifier and the destination identifier does not correspond with the current device, this indicates that the device should operate as a relay device.

If the device should act as a relay device, at step 455 the method determines whether the relay device has another sidelink towards the destination device. This may be achieved by looking up a table of active sidelinks and whether these lead to the destination device. This information may have been determined using the previously described discovery and selection method. Alternatively, the received packet may include an identifier for a next hop and if still active may be used as the sidelink on which the relay device transmits the packet. If the received packet does not include a duplication identifier and/or the destination identifier corresponds with the current device, then the device may further process the packet as normal, for example delivering to a PDCP layer.

At step 460, the packet is forwarded on the other sidelink to the destination device by sending to the associated RLC layer. The sidelink may be another PC5 interface to another relay device or to the destination device itself. By using this implementation approach, the added relay device functionality is implemented transparently to the lower layers of the device, with a single adaptation layer added which may advantageously be deployed to legacy devices using a software update.

A method for receiving and processing a received packet is illustrated in FIG. 5. The method 500 may be performed by the destination device 205E of FIG. 2. At step 505, the method receives a duplicated modified packet on one of two or more sidelinks. The packet may be processed as normal by the layer layers, with the RLC layer associated with the sidelink delivering the packet to a new layer. At step 510, the method determines whether the packet has a duplication identifier and a destination identifier matching the current device. If the packet has a duplication identifier but a different destination device identifier, then the device may operate as a relay device, for example as described with respect to FIG. 4. If there is no duplication identifier, the device may process the packet in a normal manner, for example forwarding directly to a PDCP layer.

If the packet has a duplication identifier and the destination identifier matches the current device, the method moves to step 520. As noted above, determining whether the destination identifier matches the current device may be implemented using a device identifier in the header information of a duplicated PDCP PDU, or a path identifier such as a unicast IndividualID may be relied upon. At step 520, the received duplicated modified packet is associated with a respective wireless pathway or duplication identifier. This may be implemented by adding the packet to one of two or more LCID based on its duplication identifier.

The duplication identifier and any other additional information is also removed from the duplicated modified packet at step 525 to form duplicated packets. As noted above, the addition information may include one or more of the following: the destination device identifier; the number of duplications of each packet; the source or transmitting device identifier; the PDCP identifier; path information including device identifiers for sidelink hops in the pathway.

At step 530, the duplicated packets are de-duplicated. In the case of PDCP PDU, this may be implemented in a PDCP layer using the counter system described in TS 38.323 section 5.11-5.22 of R-16. Steps 510, 520, 525 are then performed in a new layer added to standard lower and upper layers in the protocol stack of the destination device. This approach advantageously allows the additional functionality to be implemented transparently to the other layers of the device. However other arrangements are possible, for example where PDCP is not used, de-duplication may need to occur in the new layer.

Figure 6:
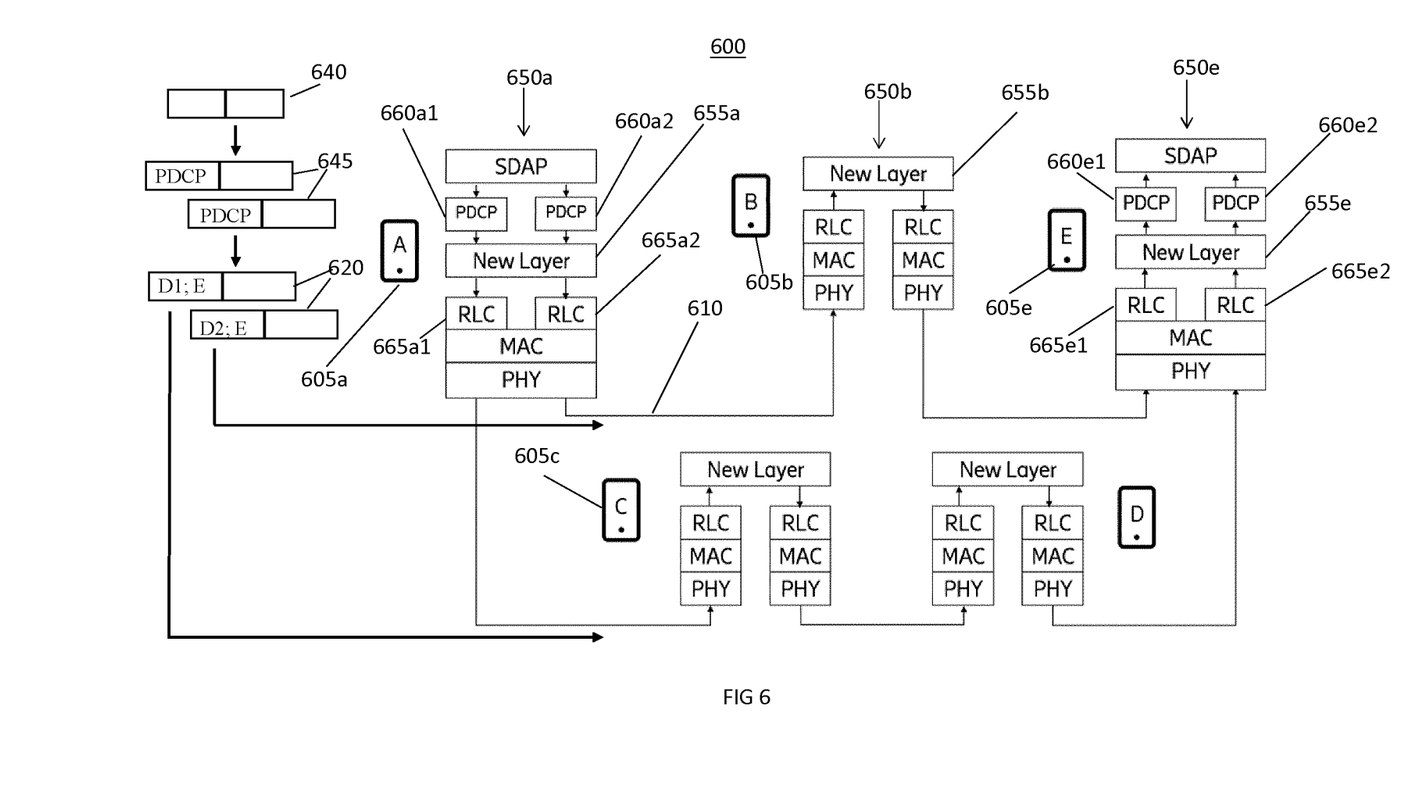
FIG. 6 is a schematic diagram illustrating processing layers of devices in a communications system according to some embodiments.
Figure 7:
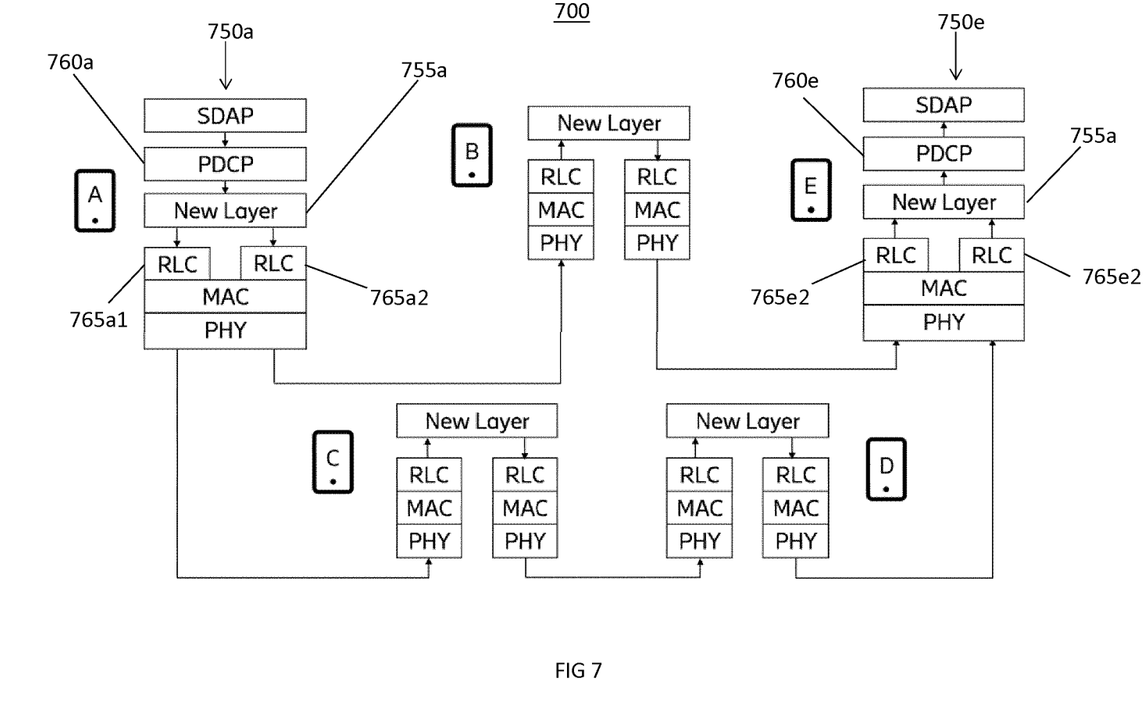
FIG. 7 is a schematic diagram illustrating processing layers of devices in a communications system according to other embodiments.

FIGS. 6 and 7 illustrate two implementations of a communications system using PDCP duplication over multiple diverse sidelink pathways. The figures illustrate the layer architectures of the transmitting device, relay devices and destination device. FIG. 6 illustrates a communication system 600 having a protocol stack 650*a* for a transmitting device 605*a*, a protocol stack 650*b* for a relay device 605*b* and a protocol stack 650*e* for a destination device 605*e*. The transmitting device stack 650*a* includes a SDAP layer, two PDCP layers 660*a*1 and 660*a*2, two RLC layers 665*a*1 and 665*a*2, MAC and PHY layers as shown, and a new layer 655*a* between the PDCP and RLC layers. All layers except the new layer 655*a* perform their standardized functions according to the 3GPP LTE or 5G NR specifications so that the new functionality implemented by the new layer operates transparently, not affecting the other layers.

The transmitting device 605*e* and destination device 605*e* establish an end-to-end SDAP entity using known signaling methods. This embodiment uses two PDCP layers 660*a*1 and 660*a*2 which form PDCP connections with corresponding layers 660*e*1 and 660*e*2 in the destination device 605*e*. The SDAP layer sends the same PDU to each PDCP layer 660*a*1 and 660*a*2 which each process this to form duplicate PDCP PDU. Rather than sending these to a corresponding RLC layer 665*a*1 and 665*a*2, the PDCP PDU are sent to the new layer which adds the duplication identifier corresponding to the respective PDCP layers 660*a*1 and 660*a*2 and any other additional information as described previously. The duplication identifier could be implemented using bits in the headers, a bitmap, a table, or as a mapping between a packet Id and a PDCP entity ID.

The duplicated modified PDCP PDU are sent on separate respective wireless pathways each comprising sidelinks, including at least one multihop sidelink using a relay device. The modified PDCP PDU arrive at the destination device 605*e* and are sent up to a new layer which groups together or associates packets arriving over the same pathway. Modified packets arriving over the same pathway will have the same duplication identifier as previously described and may be associated with the same Logical Channel ID LCID. The received modified duplicated packets have their duplication identifier and other additional information removed from the PDCP PDU header so that they can be processed by the respective PDCP layers 660*e*1 and 660*e*2 in a legacy manner. This process is performed by the new layer 655*e* which in this embodiment also maps the incoming packets from different pathways to the respective PDCP entity 660*e*1 or 660*e*2. PDCP de-duplication is performed by the PDCP layers or entities 660*e*1 and 660*e*2 as described in 3GPP specification TS38.323. The PDCP layers 660*e*1 and 660*e*2 forward de-duplicated PDCP PDU to the SDAP layer for further processing.

A modified protocol stack arrangement is shown in FIG. 7, which has the same SDAP, RLC, MAC and PHY layers but with a single PDCP layer 760*a* at the transmitting device and a single PDCP layer 760*e* at the destination layer. In this embodiment packets sent from the SDAP layer to the PDCP layer 760*a* are duplicated using the PDCP duplication mechanism referred to above. The duplicated PDCP PDU are sent to the new layer 755*a* which adds the duplication identifier and any other information to the PDCP header before sending to respective RLC layers for transmitting over the sidelinks to the destination device. At the destination device, the received duplicated modified PDCP packets are grouped at the new layer 755*e* according to their duplication identifiers, and sent to the PDCP layer 760*e* for de-duplication. Once all PDCP PDU have been received from one RLC or pathway, as determined using the sequence numbers, the duplicates received from the other RLC may be discarded. The recovered and de-duplicated PDCP PDU are then forwarded to the SDAP layer.

In a further alternative, instead of, or in addition to, adding information to the PDCP PDU header, the PDCP PDU packet may be encapsulated by the new layer into a new PDU type including having the respective duplication identifiers as header information. The new PDU are then sent to the respective RLC layers for transmitting over the sidelinks. In this embodiment, the new layer at the transmitting device, when receiving a new packet for transmission together with a request for duplication, may perform a combination of the following:

Identify available paths towards the destination device, and the group ID shared by the second hops of each path.

Generate a new layer PDU consisting of the given PDCP PDU with a header consisting of any (combination) of the following:

A duplication identifier which may include a SLRB or PDCP ID

Information to identify the destination device, and optionally the transmission device Information related to the paths, for example including identifiers for the device of the next hop, or devices for all hops in the respective path A duplication number used to identify a single duplicate The number of duplicates generated for a given packet.

Deliver the generated new layer PDU to a groupcast RLC entity/LCH

The PDCP PDU are then de-encapsulated from received new layer packets at the destination device and are de-duplicated in one of the previously described ways. The new layer is responsible for identifying received packets belonging to the same duplication PDCP entity, for example using a SLRB or PDCP ID or another duplication identifier, and to deliver them to the same duplication PDCP entity Returning to FIG. 6, each rely device 605*b*, 605*c*, 605*d* includes a protocol stack 650*b* including PHY, MAC and RLC layers for two sidelinks. PDCP PDU received on one sidelink are forwarded to a new layer 655*b* which checks if they have duplicate identifiers and whether the have a destination device identifier which is different to that associated with the current device. The PDCP PDU is then transmitted on the other sidelink as previously described with respect to FIG. 4.

In another embodiment, the transmitting device sends the same PDCP or other packet using multicasting to a group of other devices including the destination device and the relay devices determined to provide multiple pathways. These other devices may be determined using the above described discovery and selection mechanism and assigned multicast Group identifier such as a Layer 2 GroupIP. The same packet is sent over two or more sidelinks to one or more relay devices. The relay devices are preconfigured with path information and determine whether they have a direct sidelink connection to the destination device. If they do, the GroupIP is replaced with a predetermined Layer 2 IndividualID and the packet is unicast to the destination device. If the relay device does not have a direct sidelink to the destination device, it forwards the packet with GroupID onto its other sidelinks towards a relay device that does have a direct sidelink connection. The destination device receives the PDCP packet from the relay device and uses the IndividualID as the duplicate identifier. On another relay device using different sidelinks but in a different pathway, the same process is performed and the destination device receives a duplicate packet but with a different IndividualID which can be used as the duplication identifier to distinguish between the packets received over different pathways. This embodiment advantageously allows a legacy transmitting device to forward packets over multiple pathways but where the duplication discrimination is done at the relay devices having a direct sidelink to the destination device.

Figure 8:
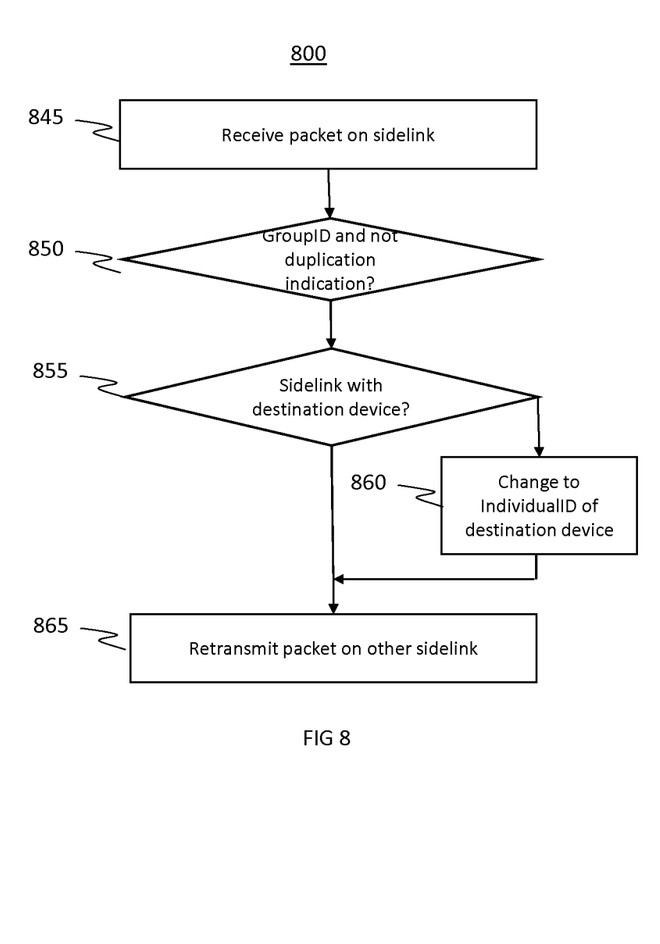
FIG. 8 is a flow diagram illustrating a method implemented in a relay device according to some embodiments.

FIG. 8 illustrates the above relay device method in more detail. At step 845, the method receives a packet over a sidelink. This sidelink may be with the transmitting device or another relay device. At step 850, the method determines whether the packet includes the GroupID and/or a duplication indicator. The indicator may be a predetermined bit or flag in the PDCP PDU header. The relay device may be configured to recognize a predetermined GroupID at the MAC layer. In either case it is possible to determine for example from a lookup table that the current device is not the destination device.

At step 855, the method determines whether it has a direct sidelink with the destination device, again this may be preconfigured and determined from a lookup table. If this is the case, at step 860 the method changes the group address of the packet to a predetermined IndividualID associated with the destination device and which will be recognized by the destination device. The packet is then transmitted on the direct sidelink with the destination device at step 865. If the relay device does not have a direct sidelink connection with the destination device, the method retains the GroupID of the received packet. The packet with the GroupID is then transmitted on one or more other sidelinks to one or more other relay devices depending on the predetermined pathways. Steps 850, 855, 860 may be implemented in the new layer 655*b*.

The logical channel between the RLC entities of the transmitting, relay and destination devices may be configured with HARQ enabled to provide additional reliability advantages, or with HARQ disabled if low latency advantages are favored.

In another embodiment, the transmitting device sends a multicast test packet to potential relay devices corresponding to different pathways, and waits for a predefined amount of time (i.e., according to a timer) for an acknowledgment, for example using the HARQ procedure. The relay devices may feedback/NACK even if it successfully decodes the transmission from the transmitting device but has no direct connection to the destination device. This option may be adopted if the PDCP priority is defined as low, i.e., there are no stringent latency requirements. This procedure may form part of the discovery procedure in order to select the potential paths from those relay devices belonging to the group—connected directly (within one-hop sidelink to the destination device. target UE) or indirectly (within two or more sidelink hops to the destination device). The transmitting device may then send packets in a unicast manner to the selected relay devices, which then forward either to another relay device or to the destination device in a unicast manner. The method of FIG. 8 may be modified to instead of swapping the GroupID to instead change the IndividualID used in the packet in a preconfigured manner. For example, a first IndividualID from the transmitting device to the relay device is swapped for a second IndividualID from the relay device to the destination device (or the next relay device) at a modified step 860. When using multicast, the transmitting device does not need to establish a single one-to-one connectivity link with each nearby device. This has advantages in terms of low delays in connectivity establishment and a leaner procedure since there is reduced signaling.

The relay device may be further arranged to drop duplicated packets it receives, for example due to unexpected reception from another relay device that was previously not connected and therefore not part of the pre-configured pathway options. When the relay determines that there is a duplication indicator, for example a predetermined flag in a PDCP header or a duplication number, the new layer of the relay device may also check the PDCP sequence number in the PDCP PDU header without processing the content of the PDCP SDU. Where a received packet is associated with the same transmitting device, the same destination device, the same duplication identifier and the same PDCP sequence number, the new layer as a previously received and forwarded packet, the new layer may discard this new packet. This advantageously avoids the resending of a repeated packet via the same pathway.

In another embodiment, the destination device when duplicating the packet, may employ one or more of the reserved bits (i.e., identified as R in 38.323) of the PDCP PDU to assign a unique PDCP ID, common for all the duplicated packets, and which may be used as a duplication flag by other devise. The destination device may then also add a duplicate ID for each of the duplicates generated for a given packet. Alternatively, the destination device when duplicating the packet, uses one or more of the reserved bits (i.e., identified as R in 38.323) to assign only a unique PDCP ID where there are two PDCP layers so that duplicates can be distinguished by the separate PDCP connections.

The destination device, after receiving the first packet from the transmitting device or one of the relays devices, stores the PDCP unique ID described above together with the duplicate ID. When another packet is received with that same PDCP ID, this is discarded.

In high priority applications requiring low latency, the transmitting device may forward packets to every other device in range that belongs to the discovered/selected group but does not wait for an ACK/NACK reply in order to define the RLC entities. In this situation, the packets may be forwarded in different paths depending on which relay successfully receives and processes the packets. However by using the above described relay methods, the destination device still receives duplicated packets which it can distinguish.

According to another embodiment, the transmitting device sets the next hop devices L2 ID as the L2 destination ID. The relay device may be configured to receive and forward the packet without modifying the MAC PDU header. This has the advantage of only requiring processing up to the MAC layer, though it does require a modified MAC layer.

In another embodiment, when forwarding a packet from the transmitting device to the destination device using unicasting towards a specific relay device or destination device, a flag is used indicating allowance of opportunistic relaying. This may be added in a SCI or MAC header. When detecting this flag, a suitably configured relay device which is not the target device in the SCI or the MAC header, may also try to decode the received MAC PDU/SDU but may not send ACK/NACK feedback. When successfully decoded, the relay device checks the identifier for the destination device, for example using the new layer. The relay device may then determine whether it can forward to the destination device and may be configured to do so. PDCP sequence numbers may be used at the destination device to discard excess copies of a duplicated packet received in this way.

The use of PDCP duplication over multiple wireless pathways using sidelinks may be triggered by conditions on a single unicast connection between the transmitting device and the destination device. For example, duplication may be triggered when:
  a. A certain number of HARQ ACK(s) are lost or a certain number of HARQ NACK(s) are received from the destination device
  b. The signal is below a pre-defined "safety" threshold which is just above the threshold to declare RLF. This threshold is may be configured based on the RSRP, RSRQ, SINR, or CBR.
  c. When a certain number of RLC retransmissions is reached. This threshold may be just below the normal maximum number of RLC retransmissions used in NR Uu/NR SL.
  d. An inactivity timer tracking transmission over the sidelinks link between the transmitting and destination devices expires, meaning no activity is detected.
  e. The QoS requirements by the destination device cannot be met, or the QoS requirements of the transmitting device when considering the reverse direction (i.e. traffic sent from the target to the source) is low.

Figure 9:
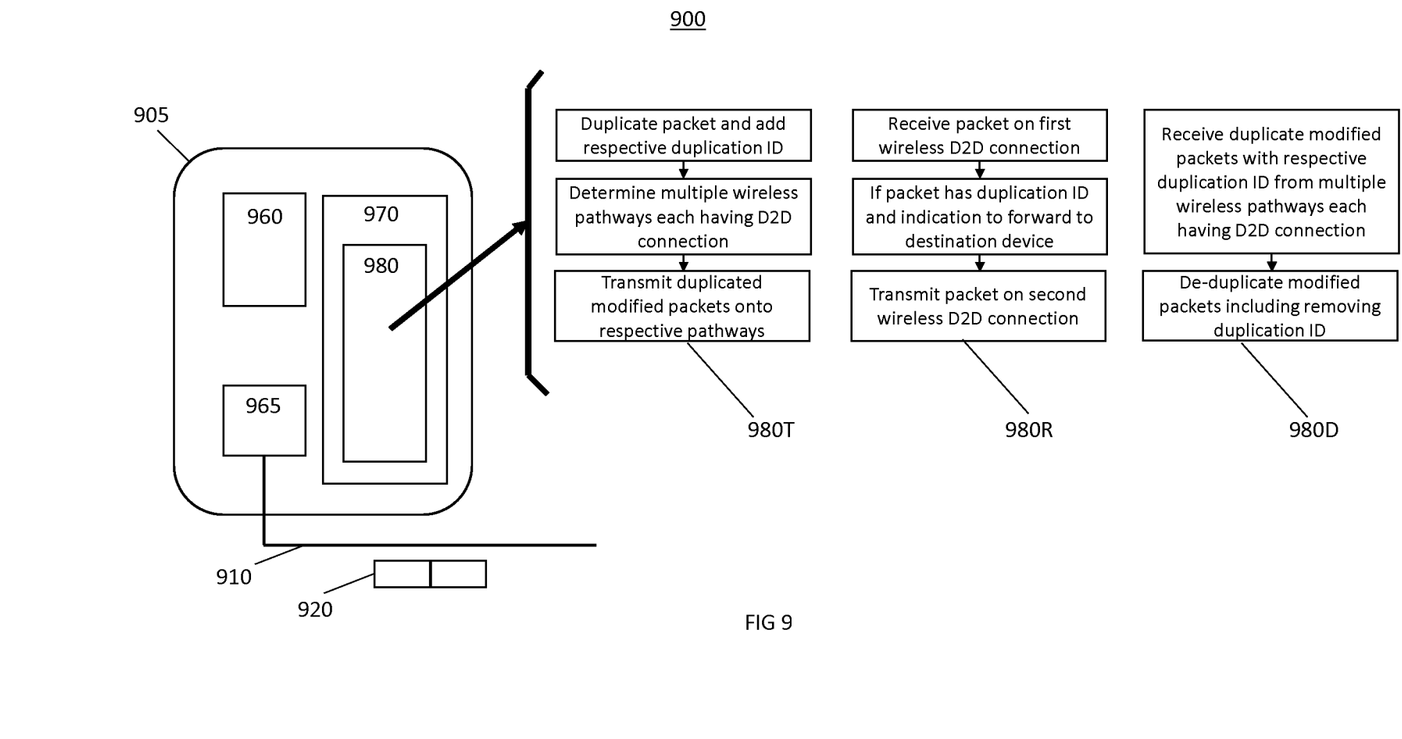
FIG. 9 is a schematic diagram illustrating the architecture of devices in a communications system according to some embodiments.

FIG. 9 is a schematic of a device which may be used to implement transmitting, relay or destination device according to embodiments. The device 905 comprises a processor 960, memory 970 containing computer program instructions which when executed by the processor cause the processor to carry out methods of the embodiments. The instructions may include those corresponding to a transmitting device 980T, a relay device 980R, a destination device 980D or a combination of these. The device also comprises a communications interface 965 which may include hardware and software arranged to implement communications protocols according to the 3GPP defined LTE and 5G NR specifications, including sidelinks 910. Packets 920 according to the embodiments are transmitted and/or received over the sidelinks 910.

Embodiments may provide a number of advantages including enhanced reliability either through diverse paths or to provide a complimentary pathway when a main pathway fails. This may be provided for in-coverage, out of coverage and partial coverage scenarios. Improved latency may also be achieved since the granularity given by the multi-paths used may guarantee that low latency sidelinks are used for the packet transmissions. The embodiments also provide solutions for transmitting packets over multihop sidelink pathways and/or transmitting duplicate packets over diverse wireless pathways including sidelinks. The embodiments also provide mechanisms for forwarding packets over multiple 5G NR sidelinks towards a destination device in a groupcast transmission. The embodiment also allow 5G NR Uu solutions (links between gNB and terminal devices) to be extended to out-of-coverage situations using sidelinks. The embodiments also enable the destination device to distinguish between different duplicates so that de-duplication may be performed accurately.

Modifications and other variants of the described embodiment(s) will come to mind to one skilled in the art having the benefit of the teachings presented in the foregoing descriptions and the associated drawings. Therefore, it is understood that the embodiment(s) is/are not limited to the specific examples disclosed and that modifications and other variants are intended to be included within the scope of this disclosure. Although specific terms may be employed herein, they are used in a generic and descriptive sense only and not for purposes of limitation.

ACRONYMS

3GPP Third Generation Partnership Project (standards organization)
5G NR Fifth Generation New Radio (air interface)
ACK/NACK Acknowledgement/No acknowledgement
CBR Channel Busy Ratio
eNB Evolved NodeB (LTE)
gNB Next Generation NodeB (5G NR)
HARQ Hybrid automatic repeat request
LCID Logical Channel ID
LTE Long term Evolution
MAC Media Access Control (layer)
MCG Master Cell Group
NSPS National Security and Public Safety
OoC Out-of-Coverage
PC5 Sidelink channel
PDCP Packet Data Convergence Protocol
PDU Packet Data Unit
PHY Physical (layer)
ProSe Proximity Services
QoS Quality of Service
RLC Radio link control
RRC Radio Resource Control
RSRP Reference Signal Received Power
RSRQ Reference Signal Received Quality RSSI Received Signal Strength Indicator
RX Receive, receiver
SCG Secondary Cell Group
SCI Service Characteristics information
SDAP Service Data Adaptation Protocol
SINR Signal to interference noise ration
SL Sidelink
SLRB Sidelink Radio Bearer
SLSS Sidelink Synchronization Signals
SynchUE Synchronization UE
TDD Time Division Duplex
TETRA Terrestrial Trunked Radio
TX Transmit, transmitter
UE User Equipment
UL Uplink
Uu Device to base station interface
V2X Vehicle to anything connection

The invention claimed is:

1. A method performed by a destination device to receive a packet, the method comprising:
   receiving duplicated modified packets each having header information including a respective duplication identifier, the duplicated modified packets being received on multiple respective wireless pathways, each wireless pathway comprising a sidelink; and
   de-duplicating the received duplicated modified packets, including removing the duplication identifier from the header information of each duplicated modified packet, in order to receive the packet, wherein de-duplicating the packet comprises associating received duplicated modified packets to one of a plurality of logical channel identities (LCID) according to their respective duplication identifiers, removing the duplication identifiers, and discarding duplicated packets from all but one of the LCID.

2. The method of claim 1, wherein the duplication identifier is a duplication number of the respective duplicated modified packet and/or a wireless pathway identifier.

3. The method of claim 1, wherein one or more wireless pathways include two or more sidelinks with one or more relay devices between a transmitting device and the destination device.

4. The method of claim 1, wherein the header information includes one or more of:
   a destination identifier corresponding to the destination device;
   a number of duplications of each modified packet;
   a source identifier corresponding to the transmitting device; or
   a device identifier for all devices in a pathway.

5. The method of claim 1, wherein the packet is a PDCP packet and the duplicated modified packets are received at respective Radio Link Control (RLC) layers according to their duplication identifiers, wherein the duplicated modified packets are discarded at one or more PDCP layers, wherein the duplicated modified packets have duplication identifiers removed at a duplication identifier layer between each PDCP layer and respective RLC layers.

6. The method of claim 1, wherein the duplicated modified packets comprise:
   duplicated PDCP PDUs having headers containing the respective duplication identifiers; or
   duplicated enlarged PDUs each having a payload containing the same PDCP PDU and a header containing the respective duplication identifiers.

7. The method of claim 6, wherein the header information of each duplicated enlarged PDU includes the same PDCP identifier associated with a PDCP entity.

8. A destination device for receiving a packet from a transmitting device, the destination device comprising a processor and memory said memory containing instructions executable by said processor whereby said destination device is configured to:
   receive duplicated modified packets each having header information including a respective duplication identifier, the duplicated modified packets being received on multiple respective wireless pathways, each wireless pathway comprising a sidelink; and
   de-duplicate the received duplicated modified packets, including removing the duplication identifier from the header information of each duplicated modified packet, in order to receive the packet, wherein de-duplicating the packet comprises associating received duplicated modified packets to one of a plurality of logical channel identities (LCID) according to their respective duplication identifiers, removing the duplication identifiers, and discarding duplicated packets from all but one of the LCID.

9. The method of claim 1, wherein the sidelink comprises a PC5 channel.

10. A non-transitory computer-readable medium having stored thereon instructions which, when executed on a processor, cause the processor to carry out the method of claim 1.

* * * * *